Sept. 9, 1941.  L. BLAHA  2,255,499
ELECTRIC HOT PLATE
Filed June 3, 1940  2 Sheets-Sheet 1
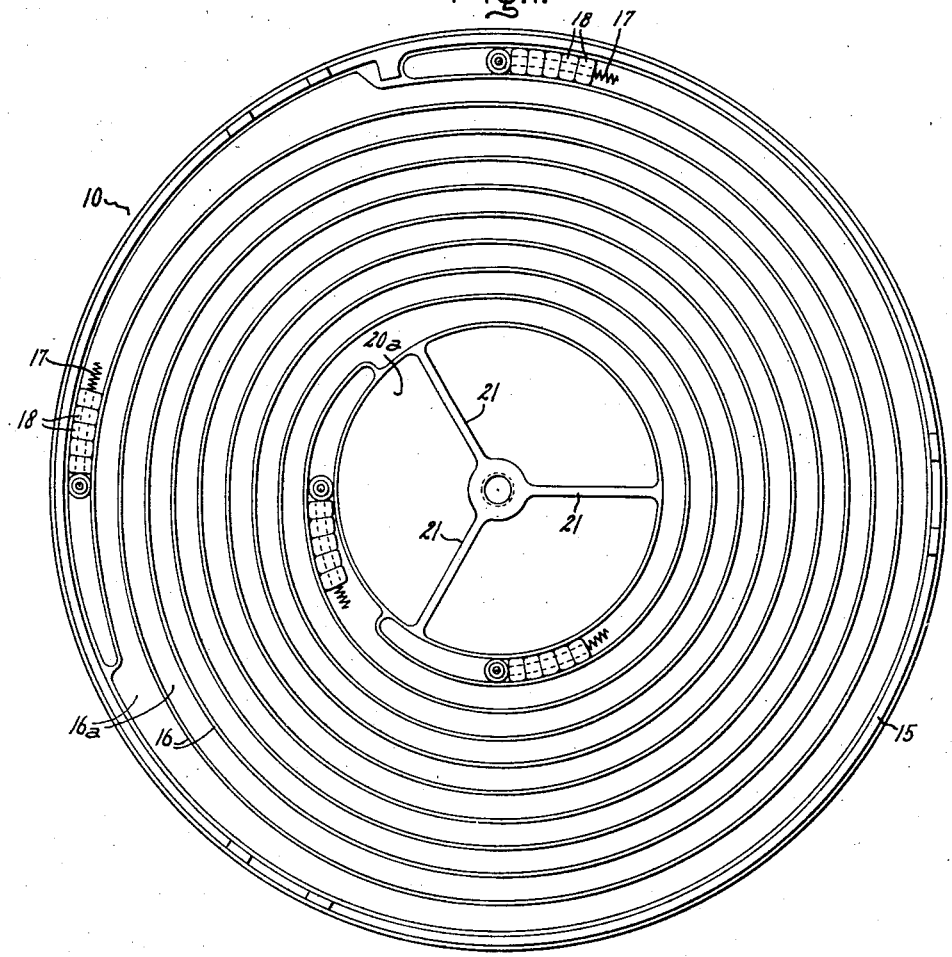
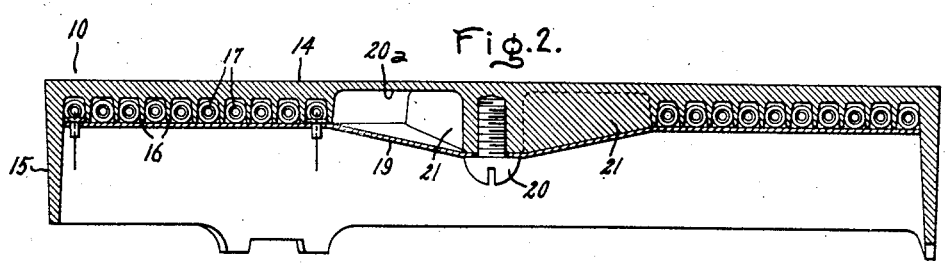
Inventor:
Leopold Blaha,
by Harry E. Dunham
His Attorney.

Sept. 9, 1941.  L. BLAHA  2,255,499
ELECTRIC HOT PLATE
Filed June 3, 1940  2 Sheets-Sheet 2
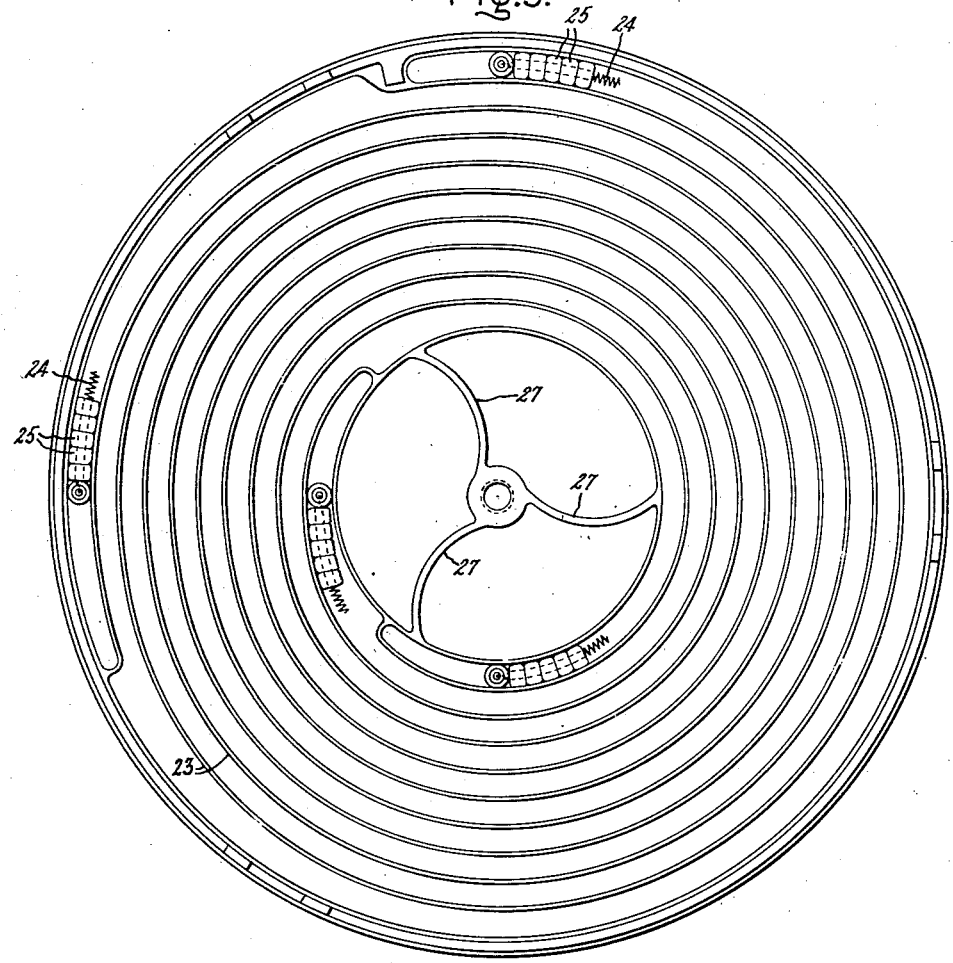
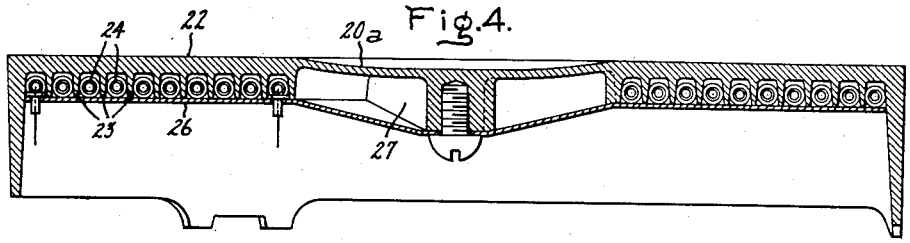
Inventor:
Leopold Blaha,
by Harry E. Dunham
His Attorney.

Patented Sept. 9, 1941

2,255,499

UNITED STATES PATENT OFFICE 2,255,499

ELECTRIC HOT PLATE

Leopold Blaha, Nuremberg, Germany, assignor to General Electric Company, a corporation of New York Application June 3, 1940, Serial No. 338,630
In Germany July 19, 1939

5 Claims. (Cl. 219—37)

This invention relates to hot plates, more particularly to electrically heated hot plates, and it has for its object the provision of an improved device of this character.

More specifically, this invention relates to hot plates having a suitable heat conducting body formed of a suitable material, such as cast metal, and a heating element for heating the plate. In particular, this invention relates to hot plates of this character in which the hot plate is provided in its lower side with grooves for housing the heating element, and where the heating element applies heat to the outer sections of the plate leaving the central portion unheated, except for conduction of heat thereto from the outer sections. Hot plates of this character have been somewhat unsatisfactory because the plate at times has cracked under repeated heating and cooling cycles. This invention contemplates a plate of this character which does not crack and which retains its shape.

In accordance with this invention, the central portion of the plate is made thinner than the remainder of the plate bottom and is provided on its lower side with a series of spaced radial ribs, preferably distributed uniformly. The ribs provided on the lower side of the middle portion of the plate insure rapid heat transfer on the one hand and serve to reenforce the middle portion on the other. The unheated central portion of the plate may be lowered somewhat relative to the remainder of the plate surface.

For a more complete understanding of this invention, reference should be had to the accompanying drawings in which Fig. 1 is a bottom plan view of an electrically heated hot plate embodying this invention with a part removed so as to illustrate certain details of construction; Fig. 2 is a sectional view taken through the hot plate of Fig. 1; and Figs. 3 and 4 are bottom plan and sectional views, respectively, of a hot plate of modified form arranged in accordance with this invention.

Referring to the drawings, this invention has been shown as applied to a hot plate for an electric range. It is to be understood, however, that this invention is applicable to hot plates in general. Also it is to be understood that while the hot plate shown is of disk-like or circular form, it may have any other suitable shape.

As shown in Figs. 1 and 2, the hot plate 10 comprises a substantially flat circular plate 14 having at its outer edge a depending flange 15. The bottom of the plate is provided with a series of spaced spiral ribs 16 defining grooves 16a for receiving a suitable resistance heating element 17, or a plurality of these elements. Each resistance element 17 is mounted in insulating beads 18 which in turn are mounted in the channels or grooves 16. These beads 18 are secured in place by a clamping plate 19. This plate 19 is secured to the plate 14 by means of a suitable screw-fastening device 20.

As shown, the heating elements 17 are distributed so as to heat the outer annular part of the plate, leaving the central portion 20a of the plate unheated, except for the heat that is conducted to it from the outer portions. The central portion of the plate, as shown clearly in Fig. 2, is made thinner than the remainder of the plate bottom, and it is provided on its lower side with a series of spaced radial ribs 21. These ribs preferably will be arranged in the form of a Y, as shown, and preferably will be uniformly distributed. The ribs 21 have their greatest height at the center of the plate, their height decreasing uniformly down to the height of the spiral ribs 16 where the central area of the plate meets the outer heated area, as clearly shown in Fig. 2. In the form of the invention shown in Figs. 1 and 2, the radial ribs 21 are straight.

In the form of the invention shown in Figs. 3 and 4, the plate 22 is provided with grooves 23, resistance conductors 24 in the grooves mounted in insulating beads 25, all of which parts have substantially the same construction as the corresponding elements shown in Figs. 1 and 2. Here also, the resistance conductors are secured by a clamping plate 26.

Here the central unheated section is made concave relative to the remainder of the late surface, as clearly shown in Fig. 4. Here also, the radially positioned ribs 27 are curved rather than being straight as are the corresponding ribs 21 of the first form.

In each case, the radial ribs reenforce the central relatively thin section of the plate and prevent cracking or warping of the plate during alternate heating and cooling cycles.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A hot plate comprising a plate-like mass having an inner central section and a thicker outer section surrounding the central section, a heating element for applying heat directly only to said outer section, and a series of spaced radial, re-enforcing ribs located only under said central section and having a radial length substantially equal to the radial dimension of said central section, said ribs being constructed and arranged to conduct heat from said outer section to said central section.

2. A hot plate comprising a plate-like mass having an inner central section and a thicker outer section surrounding the central section, a heating element for applying heat directly only to said outer section, and a series of spaced radial ribs reenforcing said central section, said ribs having a radial length substantially equal to the radial dimension of said central section, and having their greatest height adjacent the center of said central section and decreasing in height as they approach said outer section.

3. An electric hot plate comprising a plate-like mass provided on its bottom with ribs defining a groove for receiving an electric heating element, said groove being distributed over the outer area of said bottom but not over the central area thereof, said central area being thinner than said outer area, a series of uniformly distributed radial ribs reenforcing said central area and constructed and arranged to conduct heat quickly thereto from said outer area, said series of ribs having their greatest height at the center and decreasing in height uniformly down to the height of said first named ribs.

4. An electric hot plate comprising a circular plate-like mass having a flat upper surface except a central circular area which is depressed with reference to the remainder of said surface, ribs on the bottom surface of said plate defining a channel for receiving an electric heating element, a series of uniformly spaced radial ribs on the bottom of said plate reenforcing said central area thereof and insuring the rapid transfer of heat thereto, said series of ribs having their greatest height at the center of said plate and decreasing outwardly uniformly in height down to the height of said first-named ribs.

5. A hot plate comprising a plate-like mass having an inner central section and a thicker outer section surrounding the central section, a heating element for applying heat directly only to said outer section, and a series of spaced curved ribs arranged generally radially of the central section, said ribs reenforcing said central section and having their greatest height adjacent the center of said central section and decreasing in height as they approach said outer section.

LEOPOLD BLAHA.